F. M. KENNEDY.
WINDOW ATTRACTION.
APPLICATION FILED OCT. 27, 1910.
983,146.
Patented Jan. 31, 1911.
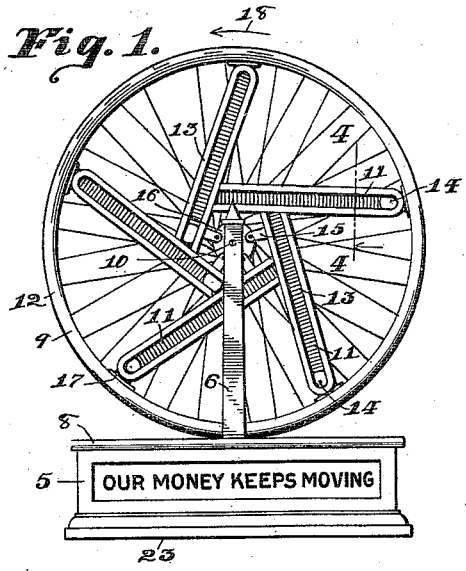
Fig. 1.
OUR MONEY KEEPS MOVING
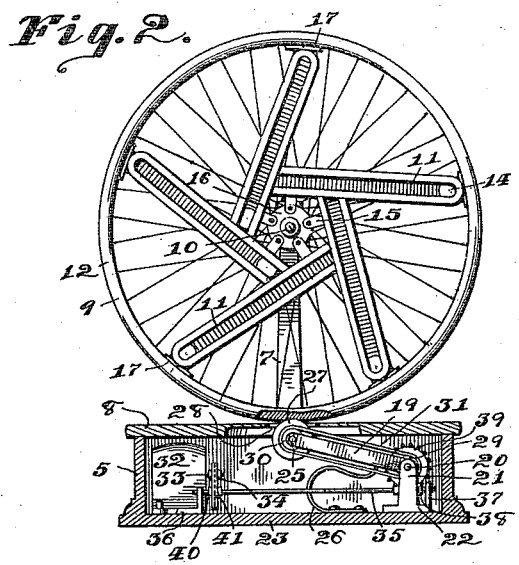
Fig. 2.
Fig. 3.
Fig. 4.
Witnesses
H. C. Adams.
John V. Dappert.
Inventor
Francis M. Kennedy
THE NORRIS PETERS CO., WASHINGTON, D. C.

UNITED STATES PATENT OFFICE.

FRANCIS M. KENNEDY, OF OKLAHOMA, OKLAHOMA.

WINDOW ATTRACTION.

983,146.  Specification of Letters Patent.  Patented Jan. 31, 1911.

Application filed October 27, 1910. Serial No. 589,290.

*To all whom it may concern:*

Be it known that I, FRANCIS M. KENNEDY, a citizen of the United States, residing at Oklahoma city, in the county of Oklahoma, State of Oklahoma, have invented certain new and useful Improvements in Window Attractions, of which the following is a full, clear, and exact description, reference being had to the drawings hereto annexed.

The object of the invention is to provide a device that will excite curiosity and cause people to study and speculate as to its construction and operation.

Referring to the drawings: Figure 1 is a front elevation of the device. Fig. 2 is a sectional view taken in the same direction as Fig. 1. Fig. 3 is an enlarged plan view of a box or base portion of the device, with the cover removed to expose interior construction. Fig. 4 is a still larger sectional view taken on the line 4—4 of Fig. 1.

Referring to the several figures, in all of which like characters of reference designate like parts, the device consists, in part, of a rectangular box or casing 5 which contains and supports parts later referred to. A front standard 6 and rear standard 7 are mounted on the top 8 of the casing 5, and a wheel 9 is mounted between and supported by said standards. A common bicycle wheel, easily recognized by everyone, is best suited for the wheel 9, and this wheel is mounted on the common bicycle axle 10, whose ends are held tightly by the standards 6 and 7. In further arranging the device, a number of run-ways or channeled arms 11, of which there are five in this instance, are mounted on the wheel 9 and extend from a central portion thereof out to its rim 12. As best shown in Fig. 4, each run-way 11 is formed of a strip of sheet metal whose edges 13 are turned forward and inward to retain a rolling disk or weight 14. The run-ways 11 are disposed tangentially with relation to the wheel 9, to conform to the construction employed in various attempts at perpetual motion, the inner end of each run-way having a lug 15 soldered to its back and connected to the hub 16 of the wheel 9. The outer end of each run-way 11 is secured to a lug 17 which is attached to the rim 12 of the wheel 9.

In the use of the device, the wheel 9 is revolved slowly in the direction of the arrow 18 in Fig. 1 by means later shown. As each run-way 11 is brought upward to and past a horizontal position on the right-hand side of the wheel 9 its circular weight 14 starts to roll inward, rolling with increasing speed until reaching the inner end of said run-way. As the run-way 11 is brought downward to and past horizontal position in its descent on the left-hand side of the wheel 9, its weight 14 starts to roll outward, rolling with increasing speed until again reaching the outer end of the run-way.

Silver dollars or twenty-dollar gold pieces are preferable to use as the weights 14, as they are of proper size and are attractive.

In arranging to drive the wheel 9, an arm 19 in the form of a cast metal frame is pivoted on a horizontal shaft 20 in one end of the casing 5, said shaft being journaled revolubly in bearings 21 projecting up integrally from a base-plate 22, and being parallel with the axle 10 of the wheel 9. The base-plate 22 is secured to the bottom 23 of the casing 5 by screws 24. The free end of the arm 19 extends to the center of the casing 5, and revolubly supports a shaft 25. The free end of the arm 19 is yieldably held upward by a bow spring 26, which rests upon the bottom 23 of the casing 5, so that a wheel 27 which is mounted tightly on the shaft 25 is held in contact with the rim 12 of the wheel 9 through a slotted opening 28 in the top portion 8 of the casing 5. The pivot shaft 20 of the arm 19 is provided with a sprocket wheel 29, and the shaft 25 at the free end of said arm with a similar sprocket wheel 30, said sprocket wheels being operatively connected by a link belt 31 so that revolving movement of the shaft 20 positively drives the shaft 25 and its wheel 27.

A small motor 32 is mounted securely in the end of the casing 5 opposite the pivot shaft 20 of the arm 19, the shaft 33 of said motor being disposed at right angles to other shafts heretofore referred to and being provided with a small sprocket wheel 34. A longer shaft 35 extends from the motor end of the casing 5 to the opposite end, said shaft being journaled in a bearing 36 secured to the bottom 23 adjacent the motor 32 and in a bearing 37 projecting upward integrally from the base-plate 22. This shaft 35 has a tight worm pinion 38 operatively engaging a worm gear-wheel 39 on the shaft 20, and also has a sprocket wheel 40 which is operatively connected with the spocket wheel 34 of the motor shaft 33 by a link belt 41.

It will be seen that, through the operative connections and speed-reducing gearing described, the motor 32 drives the wheel 27 at the free end of the arm 19, said wheel in turn slowly revolving the wheel 9 by frictional contact.

The foregoing being a full, clear, and exact description of the invention, what I claim and desire to secure by Letters Patent is:—

1. In a device of the class described, a casing, standards on the casing, a wheel revolubly supported by the standards, mechanism in the casing for driving the wheel, a member of the mechanism projecting from the casing into frictional engagement with the wheel, and weights movable on the wheel.

2. In a device of the class described, a casing, standards on the casing, a wheel revolubly supported by the standards, weights carried by and movable upon the wheel, an arm pivoted in the casing, a wheel carried revolubly by the free end of the arm, yieldable means causing said arm to press its wheel into contact with the first-named wheel, and means for driving the wheel carried by said arm.

3. In a device of the class described, a casing, standards on the casing, a wheel revolubly supported by the standards, weights carried by and movable upon the wheel, a shaft journaled in the casing parallel with the axis of said wheel, an arm pivoted on said shaft, a second wheel carried by the free end of said arm, an operative connection between said second wheel and said shaft, means for driving said shaft, and resilient means acting to cause said arm to hold said second wheel in contact with the first-named wheel.

4. In a device of the class described, a casing, standards on the casing, a wheel revolubly supported by the standards, run-ways on the wheel, weights movable in the run-ways, a shaft journaled in the casing parallel with the axis of the wheel, an arm pivoted by said shaft, a second wheel carried by the free end of said arm, an operative connection between said second wheel and said shaft, a spring acting to cause the arm to hold said second wheel in contact with the first-named wheel, and a motor adapted to drive said shaft.

5. In a device of the class described, a casing, the top of the casing having an opening, standards on the casing, a wheel revolubly supported by the standards over said opening, run-ways on the wheel, weights movable in the run-ways, a shaft journaled in the casing parallel with the axis of the wheel, an arm pivoted by said shaft, a second wheel carried by the free end of said arm and in position to be projected through said opening into contact with the first-named wheel, an operative connection between said second wheel and said shaft, resilient means acting upon the arm to cause it to hold said second wheel in contact with the first-named wheel through said opening, and a motor adapted to drive said shaft.

Witness my hand this 21 day of October, 1910.

FRANCIS M. KENNEDY.

Witnesses:
H. C. ADAMS,
JOHN V. DAPPERT.